(12) United States Patent
Clark

(10) Patent No.: US 7,187,274 B2
(45) Date of Patent: Mar. 6, 2007

(54) VIBRATING DEVICE FOR THE TURN SIGNALS IN MOTORIZED VEHICLES

(76) Inventor: Franklin D Clark, 2301 Hadden St., Muskegon, MI (US) 49441

( * ) Notice: Subject to any disclaimer, the term of this patent is extended or adjusted under 35 U.S.C. 154(b) by 170 days.

(21) Appl. No.: 11/097,088

(22) Filed: Apr. 4, 2005

(65) Prior Publication Data

US 2006/0028322 A1    Feb. 9, 2006

Related U.S. Application Data

(60) Provisional application No. 60/598,356, filed on Aug. 3, 2004.

(51) Int. Cl.
*B60Q 1/00* (2006.01)
(52) U.S. Cl. .................. 340/457; 340/475; 340/407.1
(58) Field of Classification Search .................. None
See application file for complete search history.

(56) References Cited

U.S. PATENT DOCUMENTS

| | | | | |
|---|---|---|---|---|
| 2,564,099 A * | 8/1951 | Dunning | ................. | 229/132 |
| 3,648,647 A * | 3/1972 | Joy | ................. | 116/205 |
| 4,920,822 A * | 5/1990 | Abiko | ................. | 74/552 |
| 5,406,253 A * | 4/1995 | Doke et al. | ................. | 340/475 |
| 5,455,558 A * | 10/1995 | Gregory | ................. | 340/474 |
| 5,646,590 A * | 7/1997 | Dembicks | ................. | 340/475 |
| 5,986,582 A * | 11/1999 | Greene et al. | ................. | 340/965 |
| 6,081,190 A * | 6/2000 | Kellermann | ................. | 340/465 |
| 6,091,321 A * | 7/2000 | Karell | ................. | 340/425.5 |
| 6,144,297 A * | 11/2000 | Donner | ................. | 340/475 |
| 6,236,306 B1 * | 5/2001 | Liebelt | ................. | 340/407.1 |
| 6,437,687 B2 * | 8/2002 | Spencer | ................. | 340/425.5 |
| 6,501,033 B2 * | 12/2002 | Pastwa et al. | ................. | 200/61.27 |
| 6,812,833 B2 * | 11/2004 | Rothkop et al. | ................. | 340/475 |
| 2005/0017861 A1 * | 1/2005 | Hunter | ................. | 340/457 |

* cited by examiner

*Primary Examiner*—Benjamin C. Lee

(57) ABSTRACT

A cylindrical open-ended soft material having (10) a vibrating apparatus to alert drivers of functionality of turn signal by way of tactile stimulation. (12) A gripping mechanism to adhere the vibrating device for turn signals in motorized vehicles to the turn signal arm in motor vehicles. Furthermore, this includes all signal indicators on the market. (14) A sensory receptor which will elicit a vibration which will alert the driver of the vehicle by way of tactile stimulation.

2 Claims, 2 Drawing Sheets

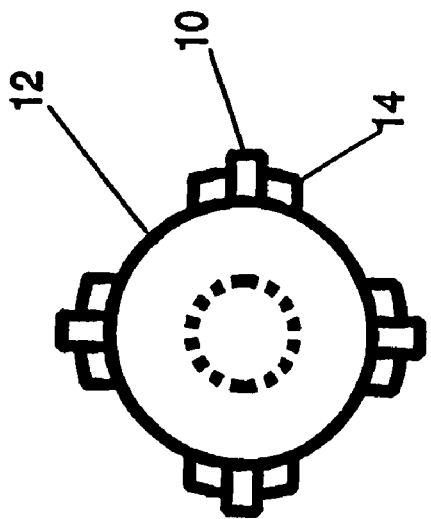
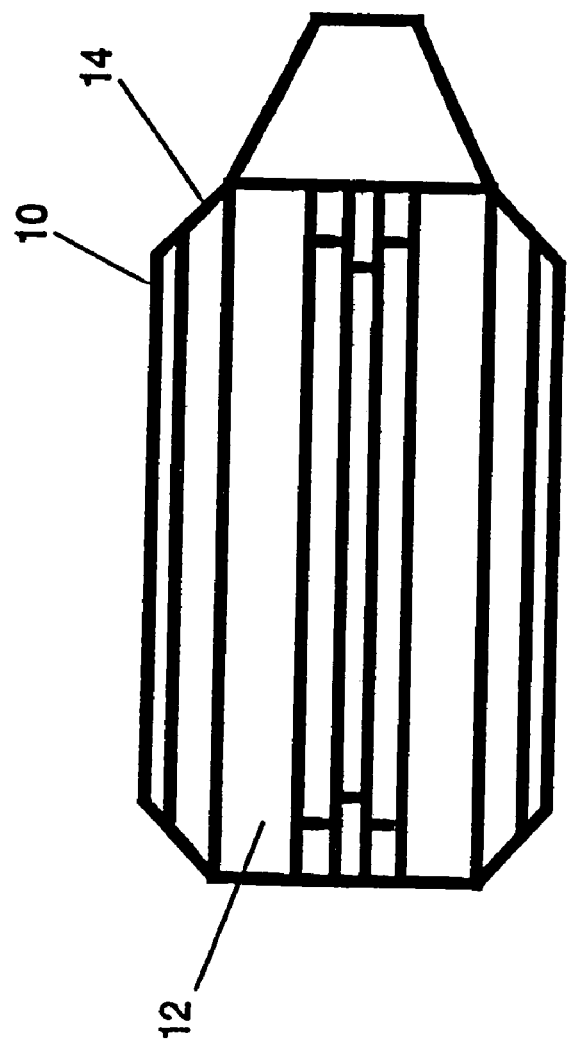
"FIG. 1"

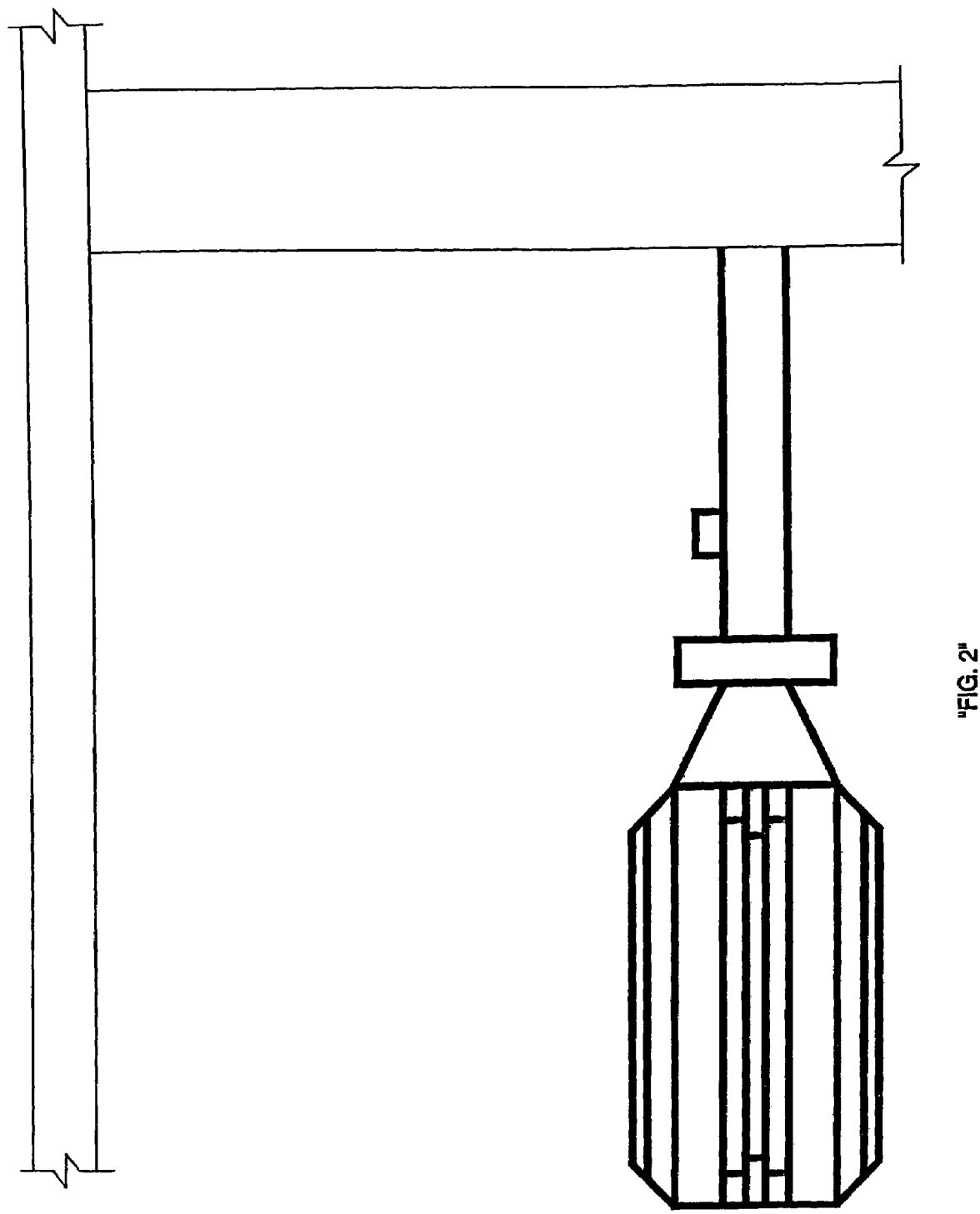
"FIG. 2"

VIBRATING DEVICE FOR THE TURN SIGNALS IN MOTORIZED VEHICLES

CROSS-REFERENCE TO RELATED APPLICATIONS

This application relates to and claims priority from U.S. provisional patent application Ser. No. 60/598,356, filed Aug. 3, 2004, the specification of which is incorporated herein by reference.

FEDERALLY SPONSORED RESEARCH

Not Applicable

SEQUENCE LISTING OR PROGRAM

Not Applicable

BACKGROUND OF THE INVENTION—FIELD OF INVENTION

The stated device will alert a driver by tactile stimulation that his/her turn signal indicated is in the mode of function. The reason this idea was conceived is because whenever drivers change lanes, pass other vehicles, or merge into traffic, many drivers do not engage their turn signal indicator to the fullest fixed position. The above said turn signal is held up or down just enough to engage the turn signal indicating a left or right movement of the vehicle. However, the turn signal indicator is not propped in its fixed position. Furthermore, drivers will no longer need to remove their eyes from the road to make sure their turn signal is activated. The idea behind this concept is to relieve the situation as far as drivers having to remove their eyes from the road to look down to make sure their turn signal is either functioning in the on position or not functioning.

BACKGROUND OF INVENTION

The vibrating device for turn signals in motorized vehicles was developed for drivers of all driving ages. Many drivers, when using a turn signal in a vehicle, do not engage the turn signal to its full engaged position. When the above said device is moved up or down, the vibrating device for turn signals will alert the driver that his/her turn signal is engaged. Sometimes in everyday driving, drivers forget to turn off, or disengage, their turn signals after use. This can be confusing for other motorists. With this product all of the above said situations will be minimized.

BACKGROUND OF INVENTION—OBJECTS AND ADVANTAGES

In conjunction with objects and advantages, the vibrating device for turn signals in motorized vehicles is:
 (a) to provide a system to alert drivers their turn signal is engaged.
 (b) to provide a system for the hearing impaired that their turn signal is engaged or disengaged.
 (c) to provide a system to increase safety and decrease confusion on the road.
 (d) to provide a system to inform drivers whether their turn signals are properly functioning.
Further, objects and advantages are to provide an alert system for a turn signal device which will allow the driver to be alerted through a tactile stimulation that his/her turn signal indicator is engaged.

SUMMARY

In accordance with the present invention, the alert system will be comprised of a vibrating apparatus as well as a power supply to create the vibrating in the above said device: "Vibrating Device For Turn Signals In Motorized Vehicles."

DRAWINGS—FIGURES

FIG. 1 (Side View) illustrates 10 as being a tactile stimulating vibrating apparatus which is located on the vibrating turn signal device for motorized vehicles.

FIG. 1 (Side View) 12 illustrates the gripping mechanism which is located on the vibrating turn signal device for motorized vehicles.

FIG. 1 (Side View) illustrates 14, a sensory receptor, which is located on the vibrating turn signal device for motorized vehicles.

FIG. 1 (Top View) illustrates 10 as being tactile stimulating vibrating apparatus which is located on the vibrating turn signal for motorized vehicles.

FIG. 1 (Top View) illustrates 12 as being the gripping mechanism, which is located on the vibrating turn signal device for motorized vehicles.

FIG. 1 (Top View) illustrates 14 as being a sensory receptor, which is located on the vibrating turn signal device for motorized vehicles.

FIG. 2 (Side View) illustrates the vibrating device for turn signals in motorized vehicles adhered to the turn signal arm.

DESCRIPTION—FIGURES

A preferred part of the vibrating device for turn signal indicator in motorized vehicles is depicted in FIG. 1 (Side View) and FIG. 1 (Top View). The vibrating apparatus 10 of the vibrating device for turn signals in motorized vehicles will alert the driver by vibration and/or tactile stimulation. The gripping mechanism 12 of the vibrating device for turn signals in motorized vehicles will adhere to the lever which is used to alert drivers when turn signal is functioning. The sensory receptor 14 of the vibrating device for turn signals in motorized vehicles will engage vibrating or tactile stimulation to the driver when turn signal is functioning.

DRAWINGS—FIGURES

FIG. 1 (Top View) and FIG. 1 (Side View) illustrate the vibrating apparatus of the vibrating device for turn signals in motorized vehicles. FIG. 1 (Top View) and FIG. 1 (Side View) illustrate the three components of the vibrating mechanism which are as stated:

FIG. 2 (Side View) illustrates all three components adhered to the turn signal arm.
 10 Vibrating apparatus to alert drivers of functionality of turn signal by way of tactile stimulation.
 12 Gripping mechanism to adhere the vibrating device for turn signals in motorized vehicles which includes all signal indicators on the market.
 14 Sensory receptor which will illicit a vibration which will alert the driver of the vehicle by way of tactile stimulation.

ADVANTAGES

The Vibrating Device for the Turn Signals in Motor Vehicles
 The device will alert a driver by tactile stimulation that his/her turn signal indicator is in mode of function. The advantages of this new idea are as follows:
 a. With this new product when the turn signal is engaged, the driver will know through tactile stimulation that his/her turn signal is functioning.

b. The product is beneficial to elderly people because of the following:

Many elderly people have a hearing loss and are not able to hear the blinking or turn signal indicator that is implemented during production of the vehicle. This new idea will alert the hearing impaired by tactile stimulation that his/her turn signal indicator is in function mode.

c. Many drivers when using the turn signal indicator will remove their eyes from the road, look down to make sure that the turn signal indicator is functioning.

This new product will make it safer for driving by way of not having to take eyes from the road to make sure that the turn signal indicator is functioning properly or moving head towards dash to hear the turn signal flashing indicator.

CONCLUSION, RAMIFICATIONS, AND SCOPE

Accordingly, the reader will see the advantages of the vibrating device for turn signals in motorized vehicles. Reasons this is a great invention are as follows:

The driver will know when his turn signal is engaged without removing his eyes from the road.

Drivers with hearing impairment will know their turn signal is engaged without trying to concentrate on the sound.

Drivers on occasion unintentionally leave their turn signal engaged. However, this vibrating device for turn signals in motorized vehicles will decrease this problem on the road.

Furthermore, the new vibrating device for turn signals in motorized vehicles may prevent some accidents from occurring.

I claim:

1. A vibrating device for turn signals in motorized vehicles comprising: a vibrating apparatus that attaches to a turn signal arm and vibrates responsive to and indicating an actuated state of the turn signal arm, to provide a tactile indication of said actuated state to a user; and a soft material with a gripping mechanism embodying said apparatus and which slides over said turn signal arm.

2. A vibrating device as in claim 1, wherein said soft material further incorporates a sensory receptor.

* * * * *